(No Model.)
E. F. WAGNER.
DRAFTSMAN'S RULE.
No. 360,545. Patented Apr. 5, 1887.
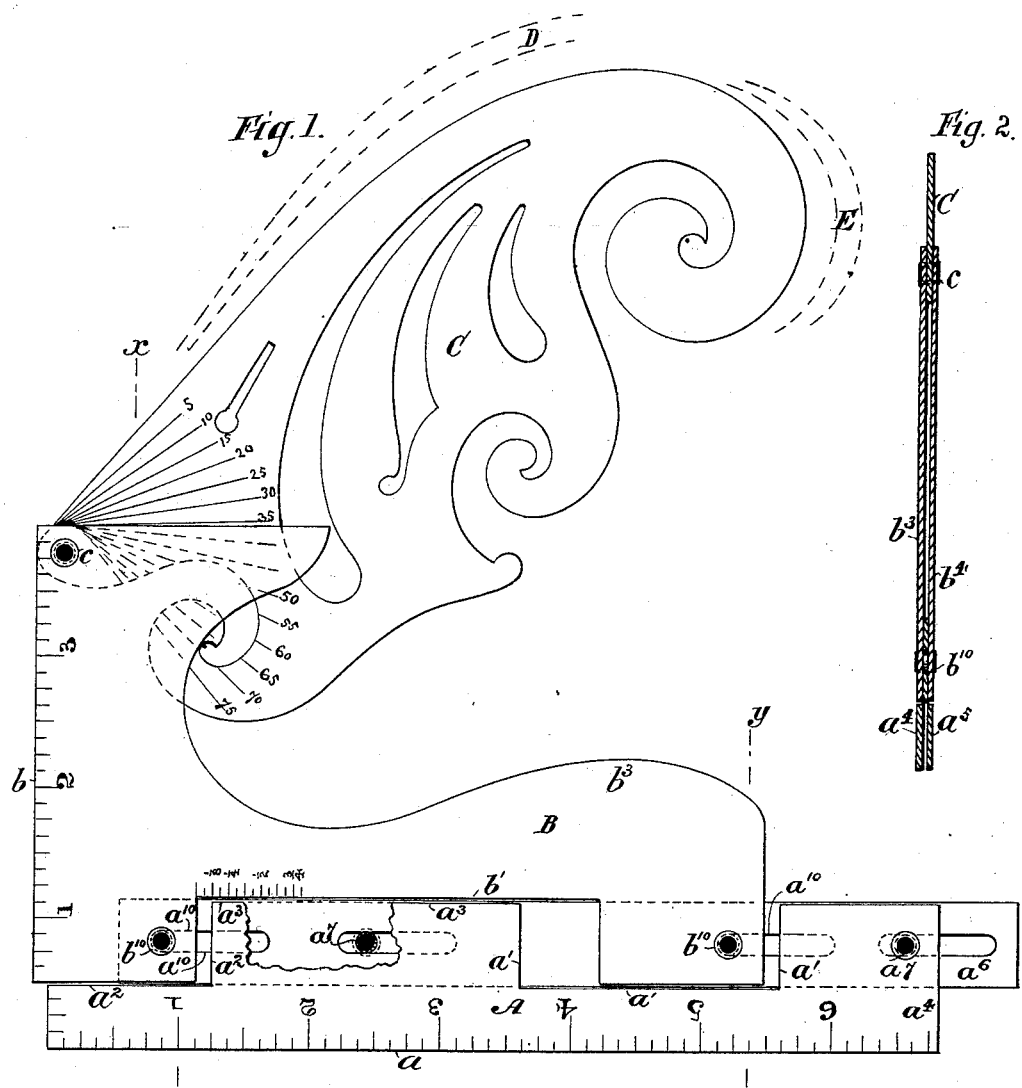
Witnesses
Geo. Wadman
Maurice J Roach
Inventor
Emanuel F. Wagner
by his attorneys
Gifford Brown

UNITED STATES PATENT OFFICE.

EMANUEL F. WAGNER, OF BROOKLYN, NEW YORK.

DRAFTSMAN'S RULE.

SPECIFICATION forming part of Letters Patent No. 360,545, dated April 5, 1887.

Application filed September 4, 1886. Serial No. 212,692. (No model.)

*To all whom it may concern:*

Be it known that I, EMANUEL F. WAGNER, of Brooklyn, in the county of Kings and State of New York, have invented a certain new and useful Improvement in Draftsmen's Rules, of which the following is a specification.

I will describe a draftsman's rule embodying my improvement, and then point out the various features in claims.

In the accompanying drawings, Figure 1 is a side view of a rule embodying my improvement, certain portions being broken away to better illustrate its construction. Fig. 2 is a transverse section thereof, taken at the plane of the dotted line $x\,x$, Fig. 1. Fig. 3 is a transverse section taken at the plane of the dotted line $y\,y$, Fig. 1.

Similar letters of reference designate corresponding parts in all the figures.

A designates what may be appropriately termed a "straight-edge."

B designates a part which may be termed a "square edge," because it is provided with an edge, $b$, which occupies a position at right angles to the principal edge $a$ of the part A.

I will here remark that it is not essential to my improvement that the part B should have an edge, $b$, at right angles to the edge $a$ of the part A, for, as will be readily understood when the construction of my rule shall have been appreciated, the part B may have its edges arranged in various positions in relation to the edge $a$ of the part A. The part A, as here shown, has at the upper edge a notch, $a'$, between its ends, and has also a notch, $a^2$, at one end. The corresponding edge of the part B has a notch, $b'$, between the ends, so as to accommodate the portion $A^3$ of the upper edge of the part A, which lies between the notches $a'\,a^2$; but the notch $b'$ is made considerably longer than the said portion $a^3$.

The part A is united to the part B, so that either of said parts may have a movement relatively to the other in the direction of the principal edge $a$ of the part A. This connection between the parts A B may be made by slotting one of the parts in the direction of the length of the edge $a$ of the part A, and passing pins or eyelets from the other part through the slot or slots so formed. I have shown slots $a^{10}$ in the part A, and eyelets $b^{10}$ fitting therein.

The connection of the parts A B, so as to provide for a movement of the part B lengthwise of the edge A of the part A, is advantageous whenever any series of evenly-spaced parallel lines are to be made with the aid of a rule, for then the part A may be held with the hand, either without any other support or while resting against a T-square or other straight-edge rule, and a line may be ruled along the edge $b$ or any other edge of the part B, after which the part B may be shifted in the direction of the length of the edge $a$ of the part A, and another line ruled along the same edge as that by means of which the first line was ruled. If, now, the part B be held down by the hand, the part A may be shifted independently of it in the direction of the length of the edge $a$ of the part A, and afterward the part A may be held and the part B be shifted in the same direction as far as the slots and pins or eyelets connecting the parts will permit of this. A third line may then be ruled, and so on. By moving first the part A while holding the part B as far as possible, and then shifting the part B while holding the part A, the edge of the part B, along which the ruling is to be done, may be shifted corresponding distances, so that the lines ruled will be accurately spaced.

Obviously, it will be desirable to provide for adjusting the rule so that relative movements of the parts A and B may be made of different lengths to secure different spacings to lines ruled. For this reason I construct the part A of three sections, two of which, $a^4\,a^5$, are exactly alike and placed in parallel positions, and the third of which, $a^6$, is a straight strip, which is interposed between the others. The section $a^6$ is slotted longitudinally. The sections $a^4\,a^5$ are secured to the section $a^6$ by means of pins or eyelets $a^7$ passing through them and the slots of the section $a^6$. The section $a^6$ is provided with the slots that receive the pins or eyelets whereby the part A and the part B are connected. The last-mentioned slots may be identical with the slots that receive the pins or eyelets $a^7$. I will here remark that the part B of the rule is preferably made of two corresponding parallel placed sections, $b^3\,b^4$, embracing the section $a^6$ of the part A. The pins or eyelets that unite the sections $b^3\,b^4$ of the part B and pass through the slots of the section $a^6$ of the part A do not clamp the sections $b^3\ b^4$ tightly together; hence the part B may easily move relatively to the part A. The eyelets $a^7$, that connect the sections $a^4\ a^5$ of the part A together and pass through the section $a^6$, are, however, preferably made to more tightly clamp the sections which they unite, so that the section $a^6$ cannot be easily shifted with relation to the sections $a^4\ a^5$. This is done so that the section $a^6$ will not be accidentally adjusted with relation to the sections $a^4\ a^5$, when the person using the rule seeks merely to move the part B relatively to the part A while ruling a number of lines that are to be uniformly spaced. The pressure of the hand will conduce to prevent any accidental adjustment between the section $a^6$ and the sections $a^4\ a^5$.

By adjusting the section $a^6$ in relation to the sections $a^4\ a^5$ provision may be afforded for moving the part B a greater or less distance with relation to the part A, because the ends of the slots in the section $a^6$ limit the movement of the part B in one direction, but the contact of the right-hand ends of the notches $a'\ a^2$ limit the movement of the part B in the other direction, and by changing the relation of these ends of the notches to the referred-to ends of the slots variations in the movements of the part B may be provided for.

C designates a scroll. It may be of any desired configuration. It is pivotally connected by a pin or eyelet, $c$, with the part B of the rule. This scroll may be adjusted at different angles with relation to the part B. Lines may be ruled from it around a circle or at different angles by adjusting the scroll on the eyelet $c$ as a pivot. I have illustrated this by dotted lines D. The scroll may be adjusted with reference to a scale marked upon it or upon the part B. Indeed, it may be marked to secure this end, and also to constitute a protractor. The scroll may be adjusted at any desirable angle and maintained there while the part B is shifted with relation to the part A, in the manner previously described. Then parallel curved lines may be made in a straight row, as illustrated by the dotted lines E.

The rule may be used with the edge $b$ of the part B, laid against a T square or rule, if desirable.

The rule may be laid over on different sides to produce reversely-extending lines. It will be seen that one of the edges of the part B is curved in addition to the curves of the scroll. Either the part A or B may be marked with a scale, to indicate the extent of movement which it may have in relation to the other.

The edge $a$ of the part A and the edge $b$ of the part B may be marked with a scale, as shown, to serve as measures.

What I claim as my invention, and desire to secure by Letters Patent, is—

1. A rule for use in drawing a number of uniformly-spaced lines, and consisting of two parts which intermatch so that the rule will have similar sides and can be reversed to present either side upward, substantially as specified.

2. A rule for use in drawing a number of uniformly-spaced lines, consisting of the part A, composed of two similar parallel sections and the section $a^6$, said parallel sections being provided with the notches $a'\ a^2$, and the part B, composed of two similar parallel sections provided with the notches $b'$, said parts A B being adjustably secured together, substantially as specified.

3. A rule for use in drawing a number of uniformly-spaced lines, and consisting of two parts, each of which is composed of two similar parallel sections, and one of which has a tongue-like portion or section that enters between the sections of the other part, substantially as specified.

4. A rule for use in drawing a number of uniformly-spaced lines, and consisting of two parts, one of which parts is composed of two similar parallel sections and an intermediate tongue-like section secured so as to be capable of longitudinal adjustment, and the other of which parts is composed of two similar parallel portions, which embrace the tongue-like section of the first-described part, and are adjustably connected thereto, substantially as specified.

5. The combination of a right-line rule composed of two similar parallel sections and a scroll pivotally connected thereto between such sections, substantially as specified.

6. The combination of a right-line rule and a scroll pivotally connected thereto, the one being provided with a scale for indicating the angle of adjustment of the scroll, substantially as specified.

7. The combination of a square rule and a scroll pivotally connected thereto, the one being provided with a scale for indicating the angle of adjustment of the scroll, substantially as specified.

8. The combination, with a right-line rule composed of two longitudinally-adjustable parts, of a scroll pivotally connected to one of the parts, the one being provided with a scale for indicating the angle of adjustment of the scroll, substantially as specified.

E. F. WAGNER.

Witnesses:
D. H. DRISCOLL,
JAS. R. BOWEN.